United States Patent
Mishra et al.

(10) Patent No.: US 10,658,909 B2
(45) Date of Patent: May 19, 2020

(54) STACKER FOR STACKING A STATOR CORE OF AN ELECTRIC MACHINE

(71) Applicant: General Electric Technology GmbH, Baden (CH)

(72) Inventors: Sanjiv Kumar Mishra, Neuenhof (CH); Massimiliano Visintin, Zürich (CH); Sabine Wernekinck, Zuzenhausen (DE); Maria-Jose Vazquez-Meleiro, Belfort (FR)

(73) Assignee: General Electric Technology, GmbH, Baden (CH)

( * ) Notice: Subject to any disclaimer, the term of this patent is extended or adjusted under 35 U.S.C. 154(b) by 173 days.

(21) Appl. No.: 15/294,909

(22) Filed: Oct. 17, 2016

(65) Prior Publication Data

US 2017/0110939 A1 Apr. 20, 2017

(30) Foreign Application Priority Data

Oct. 16, 2015 (EP) .................................... 15190127

(51) Int. Cl.
*H02K 15/02* (2006.01)
*H02K 1/18* (2006.01)

(52) U.S. Cl.
CPC ............. *H02K 15/028* (2013.01); *H02K 1/18* (2013.01); *H02K 15/02* (2013.01)

(58) Field of Classification Search
CPC ...... H01F 27/24; H01F 41/02; H01F 41/0206; H02K 15/02; H02K 1/18; H02K 15/028
See application file for complete search history.

(56) References Cited

U.S. PATENT DOCUMENTS

| 2,327,352 A | 8/1943 | Hoover |
| 2005/0235480 A1* | 10/2005 | Majernik ............... H02K 1/185 29/596 |
| 2014/0096371 A1* | 4/2014 | Wells .................. H02K 15/024 29/596 |

FOREIGN PATENT DOCUMENTS

| JP | 2003209954 A | * | 7/2003 |
| JP | 2010141942 A | | 6/2010 |
| KR | 20140031735 A | | 3/2014 |

OTHER PUBLICATIONS

European Search Report and Written Opinion dated Apr. 19, 2016 which was issued in connection with EP Patent Application No. 15190127.9 which was filed on Oct. 16, 2015.

* cited by examiner

*Primary Examiner* — Carl J Arbes
(74) *Attorney, Agent, or Firm* — Hoffman Warnick LLC

(57) ABSTRACT

The present disclosure relates to a stacker and a method to assemble a stator core of an electric machine. Disclosed is a method for stacking a stator core of an electric machine, with the steps of providing a support adjacent to the stator frame to carry at least a sheet for the stator core, grabbing the at least a sheet with an arm arranged outside the stator core, the arm has a holding device for clamping the at least a sheet, guiding the at least a sheet inside the stator frame in a horizontal direction, and arranging the at least a sheet to compose the stator core.

6 Claims, 6 Drawing Sheets

STACKER FOR STACKING A STATOR CORE OF AN ELECTRIC MACHINE

TECHNICAL FIELD

The present disclosure relates to a stacker and a method to assemble a stator core of an electric machine.

BACKGROUND

The electric machine is in particular a rotating electric machine such as a synchronous generator to be connected to a gas or steam turbine (turbogenerator) or a synchronous generator to be connected to a hydro turbine (hydro generator) or an asynchronous generator or a synchronous or asynchronous electric motor or also other types of electric machines. The basic structure of such an electric machine is a stator with a stator core enclosing a rotor with rotor core in operation. The stator core is composed from laminated annular sheets which are stacked on each other to form a cylinder. The stacking of the stator core can be done with a horizontally directed stack or with a vertically directed stack. In this disclosure the horizontal stacking is described. In maintenance and repair procedures sometimes parts of the stator core are replaced instead of the complete stator core. These parts are single sheets or stacks of several sheets. Different methods exist to achieve the stacking which has to fulfil high requirements in terms of precision to arrange the heavy parts. Mostly, devices are installed inside the stator core to stack sheets on the stator core. These devices comprise rails inside the stator housing or stator frame on which dollies carrying the sheets are moved. It is especially useful, in the context of duration of the stack procedure including the organization and built up of the necessary structure, to provide a different solution. The state of the art merely provides for stackers and methods to stack a stator core which require a substantial amount of time with corresponding costs involved.

BRIEF DESCRIPTION

It is an object of the invention to provide a stacker and a method for stacking a stator core of an electric machine, which allow a fast stacking of at least a sheet of the stator core. This object is solved with the features of a method for stacking and a stacker according to embodiments of the present invention.

In one embodiment, pairs of plates with wedges are placed into slots of the stator core during processing of the method. In this embodiment, the stability of the stator core can be kept, and adjustment of the sheet or stack of sheets to the stator core is facilitated.

In another embodiment of the invention, the lifter comprises a circular sliding device for circular motion of the sheets and a plane sliding device for horizontal motion of the sheets. These measures enable the operator to align the sheets to the stack of sheets which compose the stator core. Possible misalignments of the finished stator core can be corrected, especially with the sheets already carried into the stator core by the stacker.

BRIEF DESCRIPTION OF THE DRAWINGS

Further characteristics and advantages will be more apparent from the description of a non-exclusive embodiment of the stacker, illustrated by way of non-limiting example in the accompanying drawings, in which.

DETAILED DESCRIPTION

Figure 1:
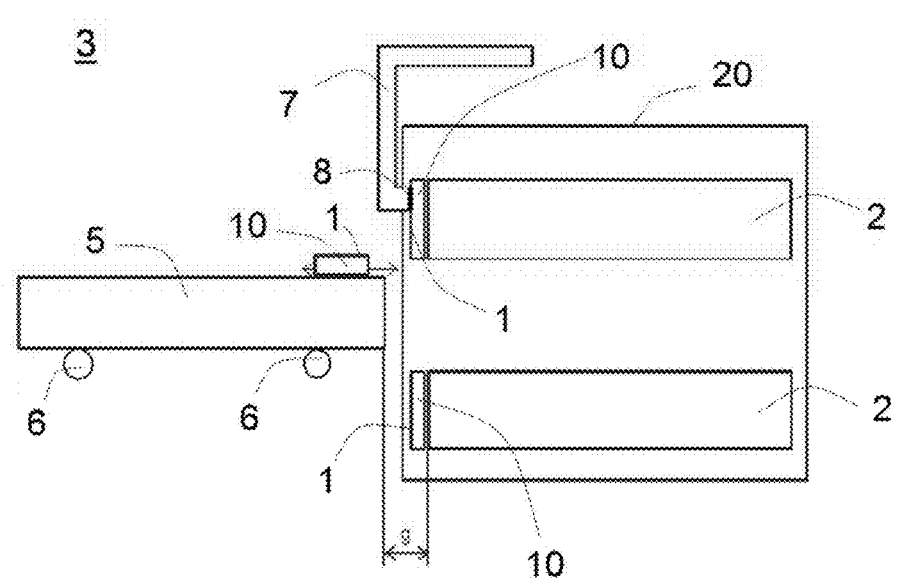
FIG. 1 shows a schematic side view of a stacker according to an embodiment of the invention with a movable support carrying a stack of sheets, a crane arm with a holding device, a stator frame housing a stator core, whereby the stacker arranges a stack of sheets to the stator core in a horizontal direction.

With reference to the figures, these show a stacker according to an embodiment of the invention next to a stator frame, a part of a stator core, and a pair of plates with wedges, wherein like reference numerals designate identical or corresponding parts throughout the several views.

FIG. 1 shows a schematic side view of a stacker 3 according to an embodiment of the invention. The stacker 3 comprises a movable support 5. The support 5 is a trolley with rollers 6 in this embodiment, which can be moved on the ground of a plant. In particular the support 5 is movable to the vicinity of a stator frame 20 of an electric machine. The stator frame 20 houses a stator core 2 commonly composed of laminated sheets 1. Here, the rotor (not shown) is already removed from the stator core 2. The support 5 carries at least a sheet 1 to be arranged to the stator core 2 and is suitable to sustain corresponding loads. The sheet 1 is commonly an annular laminated steel plate. In FIG. 1 a stack of sheets 10 is shown which is pre-assembled to replace a damaged stack of sheets 10 at the stator core 2 during repair of the electric machine. The stack of sheets 10 consists of several sheets 1 clamped together before assembly to the stator core 2 in this embodiment. The stacker 3 further comprises an arm 7 with a holding device 8, which is here designed as a crane arm. The arm 7 can be suspended at a separate frame or be integrated in one device with the support 5. In the latter embodiment the arm 7 is fixed and carried by the support 5. The arm 7 is suitable to carry high loads corresponding to the loads of the sheets 1 or stack of sheets 10. The arm 7 comprises a holding device 8 which is designed to grip and carry high loads, especially the sheets 1 and the stack of sheets 10. The holding device 8 comprises a gripper in one embodiment or a suction pad in a different embodiment. The suction pad can exert the necessary forces to grip and transport the stack of sheets 10 pneumatically. In each embodiment, the stacker 3 comprises a controller (not shown) to control the movement of the support 5 and the arm 7. The combined control of the support 5 and the arm 7 enables the fine tuning of the alignment of the stack of sheets 10 with the stator core 2. This controller is commonly known from the technical field of robotics. The controller can be operated by an operator or alternatively the described movements are performed automatically by a software on the controller. In FIG. 1 the arm 7 is via the holding means 8 connected to a stack of sheets 10 at the stator core 2. This stack of sheets 10 is a part of the stator core 2 and is disconnected manually from the stator core 2. The stack of sheet 10 to be removed is identified as being default during inspection of the electric machine. In the described method only these defect parts of the stator core 2 are removed, parts free from defects remain at the stator core 2. The defect stack of sheets 10 is removed from the stator core 2 by movement of the controlled arm 7 which grabs the sheets 1. The arm 7 pivots, grabs, and carries the defect stack of sheets 10 onto the support 5. Next, pairs of plates 23 are inserted each into one slots 22 of the stator core 2. The pairs of plates 23 are each arranged in parallel to each other with the wedge 25 movable between the plates 23 with the smaller cross-section of the wedge 25 directed outwards. The plates 23 are made from metal or from glass epoxy. These pairs of plates 23 are clamped into the slots 22 by means of the wedges 25 between the pair of plates 23. The pairs of plates 23 with the wedges 25 are pushed into the slots 22 and the plates 23 exert an outwardly directed force to the walls of the slots 22 with further introduction of the wedge 25, a friction contact is created between the slots 22 and the plates 23. When the operator has fixed the pairs of plates 23 to the slots 22 of the stator core 2 a secure connection of the pairs of plates 23 in the slots 22 is established. This feature allows the holding of the remaining stator core 2 after removing of the damaged stack of sheets 10. By this means a loosening of the stator core 2 is avoided when parts are removed and the stability of the stator core is not guaranteed any more. Moreover, the pairs of plates 23 simplify the introduction of sheets 1 to the residual stator core 2. The highly precise adjustment of the replaced sheets 1 to the sheets 1 of the stator core 2 is guaranteed. The holding device 8 at the arm 7 grabs a new sheet of stacks 10 from the support 5, the arm 7 pivots and adds the new stack of sheets 10 to the stator core 2. The slots 22 of the new stack of sheets 10 is perfectly fit to the slots 22 of the stator core 2 when the pairs of plates 23 project from the stator core 2 to be introduced into the slots 22 of the newly inserted stack of sheets 10. The stack of sheets 10 and the stator core 2 are held by keybars at the stator core back. Keybars are longitudinal bars known in the state of the art. The connection of these components can be established by welding or optionally with mechanical means. After composing the stator core 2 the pairs of plates 23 with the wedges 25 are removed from the slots 22 of the stator core 2. The described procedure can be repeated with different single sheets 1 or stacks of sheets 10. The eye bolt 26 connected to the wedge 25 is used to exert the necessary forces for removal of the wedge 25 by means of a tool engaging to the eye bolt 26. It is pointed out that the support 5 is completely outside the opening of the stator core 2, no device is introduced into the opening of the stator core 2. The method and stacker 3 facilitate the stacking and repair of stator cores 2 with no devices to be introduced and to be installed into the stator core 2.

Figure 2:
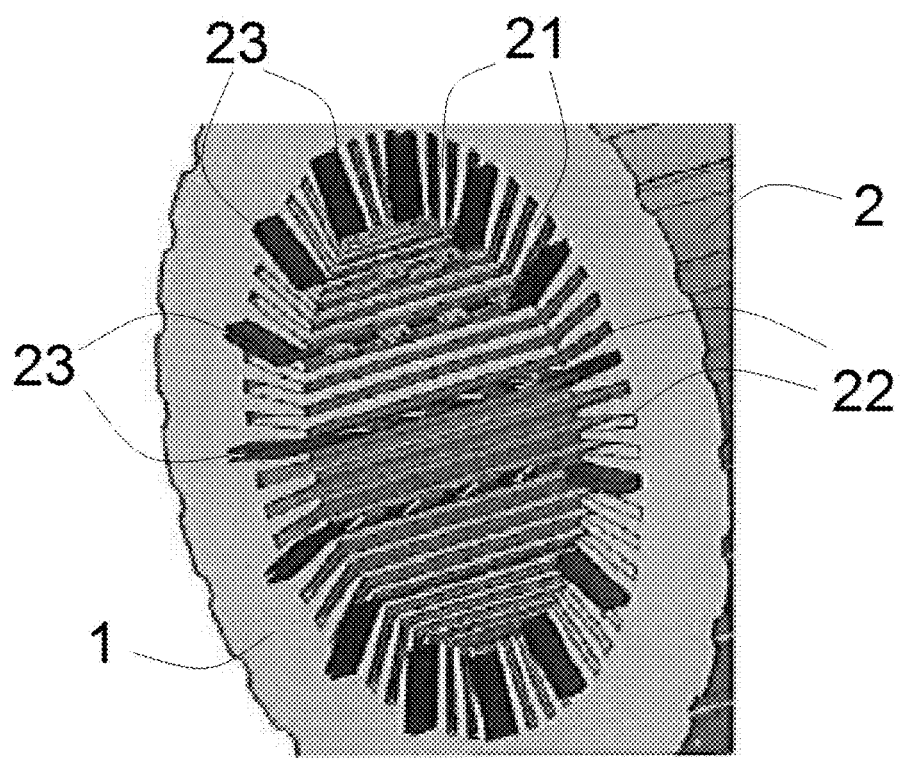
FIG. 2 shows a schematic perspective view of a part of a stator core with pairs of plates and wedges inserted into slots of the stator core to guide at least a sheet to the stator core.

FIG. 2 shows a perspective view of a part of a stator core 2 with a cylindrical opening for insertion of a rotor (not shown). In this illustration a defect stack of sheets 10 is removed from the stator core 2, the stator core 2 is incomplete thus. Shown are the slots 22 fabricated at the inside of the stator core 2 encompassed by corresponding teeth 21. The slots 22 are commonly used to house the stator conductor bars. In the described method the conductor bars are removed from the stator core 2. Instead, pairs of plates 23 with wedges 25 between are inserted into at least some of the slots 22. In this embodiment, each fourth slot 22 is arranged with a pair of plates 23. The pairs of plates 23 with wedges 25 are fixed into the slots 22 as described above. The pairs of plates 23 project through a part or the whole axial length of the slots 22 and project beyond the teeth 21 of the stator core 2, as can be seen in FIG. 2. The protruding parts of the plates 23 serve to guide at least a sheet 1 or the stack of sheets 10 to the stator core 2 to fit with high precision. The protruding parts of the plates 23 engage into the slots 22 of the insertable stack of sheets 10. The stacking is done in a horizontal direction with the stator core 2 projecting parallel to the ground, as can be seen in FIG. 1. After one or more stack of sheets 10 are connected to the stator core 2 the stator core 2 is completed, a pressing plate (not shown) is installed at the end of the stator core 2 to additionally clamp the sheets 1, for example by hydraulic devices. To further tighten the stator core 2 bolts can be applied axially through the stator core 2. The repair of the stator core 2 is essentially finished then.

Figure 3:
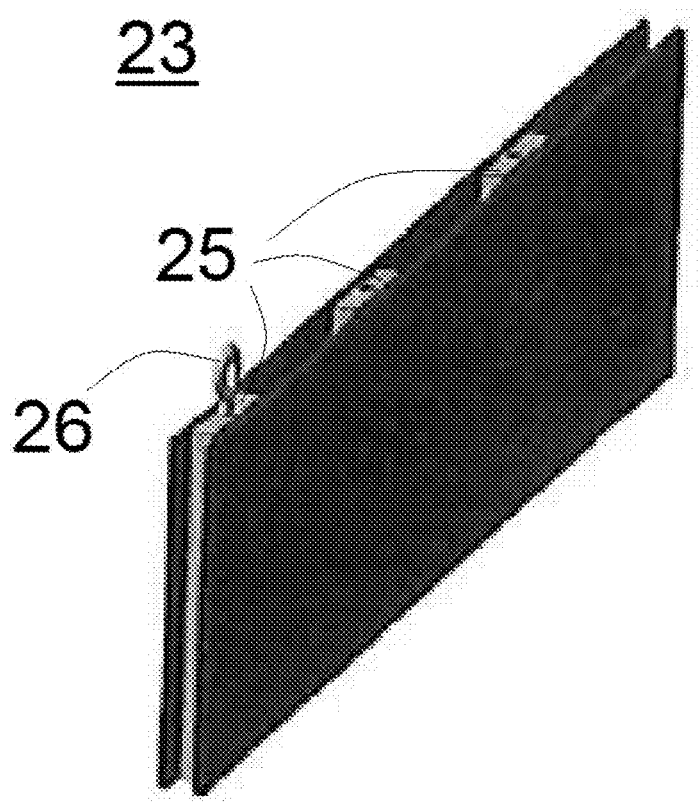
FIG. 3 shows a schematic perspective view of a pair of plates with wedges to insert into slots of a stator core.

FIG. 3 shows a perspective view of a pair of plates 23 which consists of two shiftable parallel plates 23 which are divided by wedges 25. In this embodiment, the pair of plates 23 comprises three wedges 25 between the plates 23. The wedges 25 project perpendicular to the longitudinal axis of the pair of plates 23. The wedges 25 have threaded bores to screw in eye bolts 26. By engaging a tool through the eye of an eye bolt 26 the wedge 25 can be pulled out and removed from the pair of plates 23. Also, by moving the slanted wedge 25 up or down the force on the faces of the plate 23 to the walls of the slots 22 can be adjusted.

Figure 4:
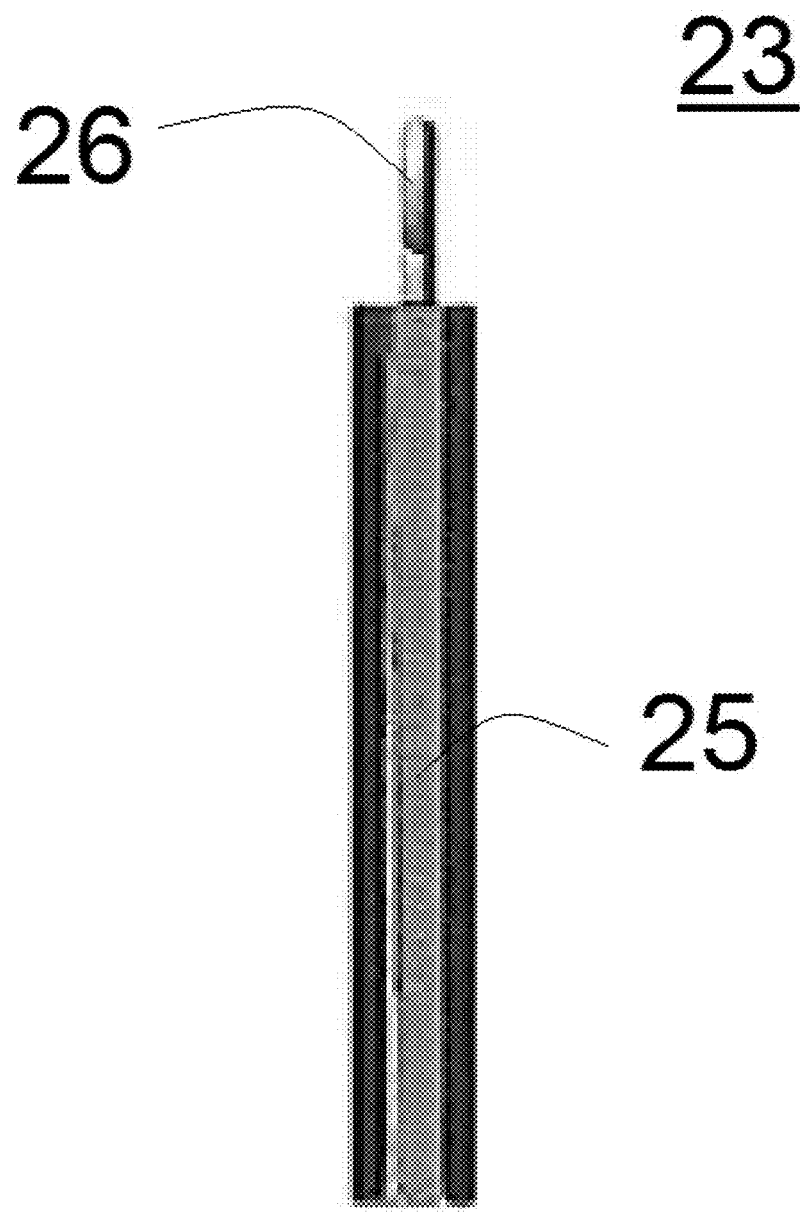
FIG. 4 shows a schematic side view of a pair of plates with a wedge according to FIG. 3.

FIG. 4 shows a side view of a pair of plates 23 a wedge 25 according to FIG. 3. The wedge 25 is arranged with an eye bolt 26 at the upper end, shown in front view. The wedge 25 is tapered downwards. With such a design the forces onto the plates 23 are enhanced when the wedge 25 is moved down and the plates 23 are pressed outwards to the walls of the slot 22.

Figure 5:
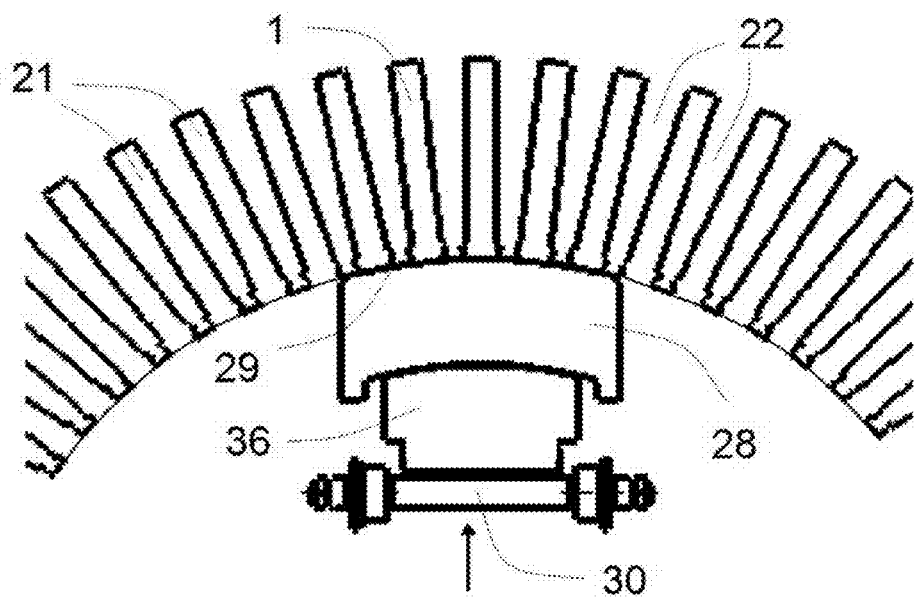
FIG. 5 shows a schematic side view into the stator core with a cut part of sheets to be stacked, a lifter to lift the sheets in alignment with the stator core, a wedge shoe to mate to the sheets, and an adapter to connect the lifter to the wedge shoe.

FIG. 5 shows a schematic side view into the stator core 2 with a cut part of sheets 1 to be stacked. Shown in a schematic view are the slits 22 and the corresponding teeth 21 defining the slits 22 of the sheets 1. The horizontal stacking is done perpendicular into the image plane. The arm 7 of the stacker 3 reaching into the stator core 2 is not shown here. As described the arm 7 reaches into the stator core 2, perpendicularly into the image plane. At the end of the arm 7 a lifter 30 is arranged. The lifter 30 comprises a pneumatic arrangement to lift the lifter 30 in a controlled manner in the direction illustrated by the arrow. The direction the lifter 30 is moved is the vertical direction of the stator core 2. The lifter 30 is connected via an adapter 36 to a wedge shoe 28. The adapter 36 and the wedge shoe 28 are moved when the lifter 30 is moved accordingly. The wedge shoe 28 has a bended face 29 at the upper side which bending mates to the bending of the sheets 1 to be stacked, as can be seen in FIG. 5. The wedge shoe 28 is especially suitable to carry sheets 1. Further, with application of the lifter 30 the sheets 1 are aligned to the stator core 2. The sheets 1 are lifted until an appropriate alignment of the sheets 1 to the already stacked sheets 1, the stack 10, or the end plate of the stator core 2 is achieved. As a high precision is necessary for the stacking process the pneumatic device of the lifter 30 to lift with high sensitivity is of utmost significance.

Figure 6:
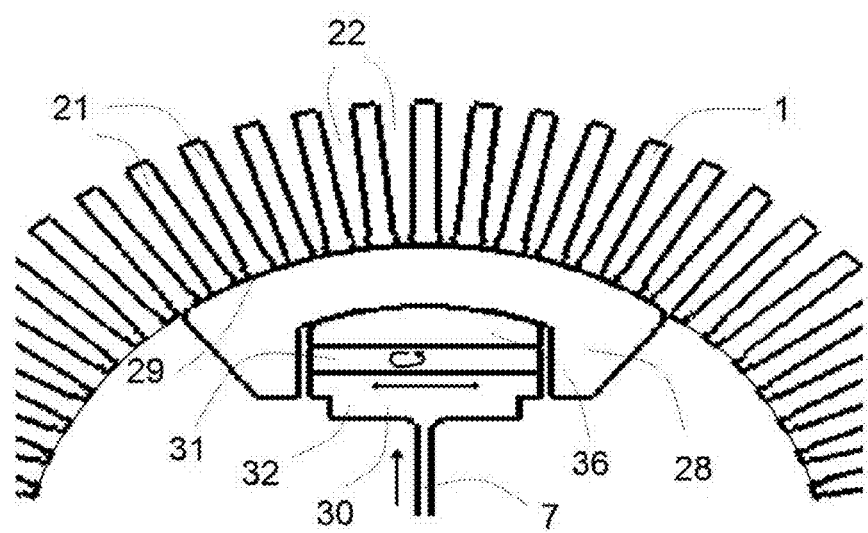
FIG. 6 shows a schematic side view similar to FIG. 5 with a lifter comprising a circular sliding device for circular motion of the sheets and a plane sliding device for tangential motion of the sheets to align the sheets to the stator core.

FIG. 6 shows a schematic side view similar to FIG. 5 with a lifter 30 connected to the arm 7 to project into the stator core 7. The lifter 30 lifts the sheets 1 to the proper position to align the sheets 1 to the stator core 2 similar to the example of FIG. 5. In addition, the lifter 30 comprises a circular sliding device 31 suitable for circular motion, as indicated by the bended arrow. The circular sliding device 31 is at one side connected to the adapter 36 to connect to the wedge shoe 28. The circular motion around the vertical axis of the circular sliding device 31 is transferred via the adapter 36 to the wedge shoe 28 and the sheets 1. The circular movement is steered by the operator of the stacker 3 to fine-tune the rotational position of the sheets 1 in the stator core 2. In case of a misalignment of the angle of the sheets 1 with regard to the stack 10 the operator aligns the sheets 1 by rotating the circular sliding device 31 with a proper angle. At the lower side the circular sliding device 31 is connected to a plane sliding device 32 which is connected to the arm 7 of the stacker 3. The plane sliding device 32 can perform a horizontal motion of the sheets 1, as indicated by the horizontal arrow. Moving the plane sliding device 32 causes a corresponding movement of the wedge shoe 28 via the circular sliding device 31 and the adapter 36. The operator of the stacker 3 triggers the plane sliding device 32 to fine-tune the position of the sheets 1 to the stack 10 in the horizontal direction. Applying the plane sliding device 32 and the circular sliding device 31 with the stacker 3 allows the alignment of the sheets 1 with the stack of sheets 10 in all directions. The stacking process is facilitated as misalignments are compensated directly at the stack 10, pulling out, grabbing the sheets 1 again, and re-tracking of the sheets 1 can be avoided. The stacker 3 saves maintenance time thus. Moreover, and even more important, obliquely installed sheets 1 leading to an impaired magnetic behaviour are avoided.

While the disclosure has been described in detail with reference to exemplary embodiments thereof, it will be apparent to one skilled in the art that various changes can be made, and equivalents employed, without departing from the scope of the application. The foregoing description of embodiments of the invention has been presented for purposes of illustration and description. It is not intended to be exhaustive or to limit the application to the precise form disclosed, and modifications and variations are possible in light of the above teachings or may be acquired from practice embodiments of the invention. The embodiments were chosen and described in order to explain the principles of the invention and its practical application to enable one skilled in the art to utilize the invention in various embodiments as are suited to the particular use contemplated. It is intended that the scope of the application be defined by the claims appended hereto, and their equivalents.

What is claimed is:

1. A stacker for stacking sheets to compose a stator core of an electric machine, comprising:
    a movable support outside the stator frame configured to carry the sheets; and
    an arm arranged outside the stator frame adjacent the support for contacting the sheets carried by the support, the arm comprising a holding device for gripping at least one sheet of the sheets carried by the support, operable to grip, guide, and stack the at least one sheet in a horizontal direction on the stator core within the stator frame.

2. The stacker according to claim 1, wherein the support is a trolley movable by roller supports.

3. The stacker according to claim 2, wherein the arm is a crane arm.

4. The stacker according to claim 3, wherein the arm comprises at least a suction pad configured to temporarily fix the at least one sheet to the arm by the suction pad exerting a suction force on the at least one sheet.

5. The stacker according to claim 1, wherein the arm comprises a wedge shoe with a bended face corresponding to the sheets and configured to mate to the sheets from an inner side of the sheets, and a lifter configured to lift the sheets via the wedge shoe in a vertical direction.

6. The stacker according to claim 5, wherein the lifter comprises a circular sliding device for circular motion of the sheets and a plane sliding device for horizontal motion of the sheets for alignment of the sheets to the stator core.

* * * * *